US008041770B1

(12) United States Patent
Schmidt

(10) Patent No.: US 8,041,770 B1

(45) Date of Patent: Oct. 18, 2011

(54) METHOD OF PROVIDING INSTANT MESSAGING FUNCTIONALITY WITHIN AN EMAIL SESSION

(75) Inventor: Mark Timothy Schmidt, Brussels (BE)

(73) Assignee: Avaya Inc., Basking Ridge, NJ (US)

( * ) Notice: Subject to any disclaimer, the term of this patent is extended or adjusted under 35 U.S.C. 154(b) by 784 days.

(21) Appl. No.: 11/486,225

(22) Filed: Jul. 13, 2006

(51) Int. Cl.
*G06F 15/16* (2006.01)

(52) U.S. Cl. .......................................................... 709/206

(58) Field of Classification Search .................... 709/206
See application file for complete search history.

(56) References Cited

U.S. PATENT DOCUMENTS

| | | | | | |
|---|---|---|---|---|---|
| 6,167,434 | A * | 12/2000 | Pang | ............ | 709/206 |
| 6,763,376 | B1 * | 7/2004 | Devine et al. | ............ | 709/223 |
| 6,917,610 | B1 * | 7/2005 | Kung et al. | ............ | 370/352 |
| 6,961,878 | B2 * | 11/2005 | Kirkpatrick et al. | ............ | 714/57 |
| 2002/0099777 | A1 * | 7/2002 | Gupta et al. | ............ | 709/206 |
| 2003/0110227 | A1 * | 6/2003 | O'Hagan | ............ | 709/206 |
| 2004/0054646 | A1 * | 3/2004 | Daniell et al. | ............ | 707/1 |
| 2004/0054719 | A1 * | 3/2004 | Daigle et al. | ............ | 709/203 |
| 2004/0054735 | A1 * | 3/2004 | Daniell et al. | ............ | 709/206 |
| 2004/0054736 | A1 * | 3/2004 | Daniell et al. | ............ | 709/206 |
| 2004/0054737 | A1 * | 3/2004 | Daniell | ............ | 709/206 |
| 2004/0064514 | A1 * | 4/2004 | Daniell et al. | ............ | 709/206 |
| 2004/0078441 | A1 * | 4/2004 | Malik et al. | ............ | 709/206 |
| 2004/0078446 | A1 * | 4/2004 | Daniell et al. | ............ | 709/206 |
| 2004/0078448 | A1 * | 4/2004 | Malik et al. | ............ | 709/206 |
| 2004/0125924 | A1 * | 7/2004 | McMullin et al. | ............ | 379/88.19 |
| 2004/0268188 | A1 * | 12/2004 | Kirkpatrick et al. | ............ | 714/45 |
| 2005/0033811 | A1 * | 2/2005 | Bhogal et al. | ............ | 709/206 |
| 2005/0080851 | A1 * | 4/2005 | Kent et al. | ............ | 709/205 |
| 2005/0080862 | A1 * | 4/2005 | Kent et al. | ............ | 709/206 |
| 2005/0080864 | A1 * | 4/2005 | Daniell | ............ | 709/206 |
| 2005/0086211 | A1 * | 4/2005 | Mayer | ............ | 707/3 |
| 2005/0102351 | A1 * | 5/2005 | Jiang et al. | ............ | 709/201 |
| 2005/0141511 | A1 * | 6/2005 | Gopal | ............ | 370/395.2 |
| 2005/0147213 | A1 * | 7/2005 | Arnoff et al. | ............ | 379/88.13 |
| 2005/0147220 | A1 * | 7/2005 | Arnoff et al. | ............ | 379/88.22 |
| 2005/0160146 | A1 * | 7/2005 | Arnoff | ............ | 709/206 |
| 2006/0095514 | A1 * | 5/2006 | Wang et al. | ............ | 709/204 |
| 2006/0123347 | A1 * | 6/2006 | Hewitt et al. | ............ | 715/748 |
| 2006/0218491 | A1 * | 9/2006 | Grossman et al. | ............ | 715/517 |
| 2006/0288107 | A1 * | 12/2006 | Klassen et al. | ............ | 709/227 |
| 2007/0005701 | A1 * | 1/2007 | Barsness et al. | ............ | 709/205 |
| 2007/0083675 | A1 * | 4/2007 | Vemulapelli et al. | ............ | 709/246 |
| 2007/0224978 | A1 * | 9/2007 | Wherry et al. | ............ | 455/414.2 |
| 2010/0153491 | A1 * | 6/2010 | Li | ............ | 709/203 |

OTHER PUBLICATIONS

Microsoft Office Outlook 2003 SP2 screen captures (2003).*
Yahoo Protocol Study, author unknown (Jun. 15, 2005).*

* cited by examiner

*Primary Examiner* — William Vaughn, Jr.
*Assistant Examiner* — Scott Christensen
(74) *Attorney, Agent, or Firm* — Chapin IP Law, LLC; David W. Rouille, Esq.

(57) ABSTRACT

A method, apparatus and computer program product for providing instant messaging functionality within an Email session is presented. An intended Email recipient is notified that an Email message is currently being written to them. The intended Email recipient is invited to view the Email message. The intended Email recipient is permitted to interact with the originator of the Email by way of an instant messaging session.

22 Claims, 8 Drawing Sheets

METHOD OF PROVIDING INSTANT MESSAGING FUNCTIONALITY WITHIN AN EMAIL SESSION

BACKGROUND

Electronic mail (Email) has become ubiquitous. Email is used to transmit messages over communications networks. The messages can be notes entered from a keyboard or electronic files stored on a disk. Most Email systems have gateways to other computer systems, enabling users to send Email virtually anywhere in the world. Email has proven to be a fast, flexible, and reliable means of communication. Once a message is composed, the message is sent to the recipient by specifying the recipient's address. Sent messages are stored in electronic mailboxes until the recipient fetches them. To see if a user has any Email, the user checks their electronic mailbox, although many systems alert a user when an Email is received. After reading an Email, the user can store the Email message in a text file, forward the Email message to other users, or delete the message. Most online services and Internet Service Providers (ISPs) offer e-mail, and most also support gateways so that Email can be exchanged with users of other systems. Email has proven to be a particularly effective way to communicate with a group because messages can be broadcast to everyone in a group at once.

Instant Messaging (IM), is a type of communications service that enables a user to create a kind of private chat room with another individual in order to communicate in real time over the Internet, analogous to a telephone conversation but using text-based, not voice-based, communication. Typically, the IM system alerts the user whenever somebody on the user's private list is online. The user can then initiate a chat session with that particular individual.

IM requires the use of a client program that hooks up an instant messaging service and differs from e-mail in that conversations are then able to happen in real-time. Most IM services offer a presence information feature, indicating whether people on one's list of contacts are currently online and are available to chat. Most instant messaging applications also include the ability to set a status message, roughly analogous to the message on a telephone answering machine.

Instant messaging typically boosts communication and allows easy collaboration. In contrast to e-mails or phone, the parties know whether the peer is available. Most IM systems allow the user to set an online status or away message so peers get notified whenever the user is available, busy, or away from the computer. People are not forced to reply immediately to incoming messages. This way, communication via IM can be less intrusive than communication via phone, which is partly a reason why IM is becoming more and more important in corporate environments. Instant messages typically get logged in a local message history, facilitating quick, safe, and persistent exchange of information such as URLs or document snippets, which can be unwieldy when done using inappropriate media such as a phone.

SUMMARY

Conventional mechanisms such as those explained above suffer from a variety of deficiencies. Conventional instant messaging products can perform a "chat conference" between two or more people, however this requires checking the presence/status of the recipients before inviting them to chat to make sure they are available. Email products can send Emails, however most Email solutions do not know the presence/status of an Email recipient while the Email is being written and do not proactively pass the content of the Email to a recipient that may also be on line.

IM solutions require inviting known and present members of the IM community to a chat. Also, it is not natural to convert the complete chat transcript to an Email, or cutting parts of an Email to make an IM. Current instant messaging products lack the functionality to easily convert an instant message into an Email, and current Email products lack the functionality to involve the recipients of the Email as the Email is being written.

IBM NotesBuddy™ solution implements a link between IM and "Email-like" storage, and also can show presence of Email recipients in an Email, however this does not add additional functionality to make this a true synergy between Email and IM.

Conventional products also do not show if someone else is already writing a response to to an Email that is in a mailbox. Conventional IM and Email products do not merge a real-time collaborative text-chatting (or IM) option with the power of a stateless messaging option such as Email, including features such as notification of Email intention and status, in-line collaboration, and dynamic Email address-line updating.

Embodiments of the invention significantly overcome such deficiencies and provide mechanisms and techniques that provide IM functionality within an Email session (sometimes referred to herein as Chat-mail).

In a particular embodiment of a method for providing instant messaging functionality within an Email session, the method includes notifying at least one intended Email recipient that an Email message is currently being written to them. The method further includes inviting the at least one intended Email recipient to view the Email message as the message is being constructed. Additionally, the method includes allowing the at least one intended Email recipient to interact with the originator of the Email by way of an instant messaging session.

Other embodiments include a computer readable medium having computer readable code thereon for providing instant messaging functionality within an Email session. The computer readable medium includes instructions for notifying at least one intended Email recipient that an Email message is currently being written to them. The computer readable medium further includes instructions inviting the at least one intended Email recipient to view the Email message as the message is being constructed. Additionally, the computer readable medium includes instructions allowing the at least one intended Email recipient to interact with the originator of the Email by way of an instant messaging session.

Still other embodiments include a computerized device, configured to process all the method operations disclosed herein as embodiments of the invention. In such embodiments, the computerized device includes a memory system, a processor, and a communications interface in an interconnection mechanism connecting these components. The memory system is encoded with a process that provides instant messaging functionality within an Email session as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method for providing instant messaging functionality within an Email session as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
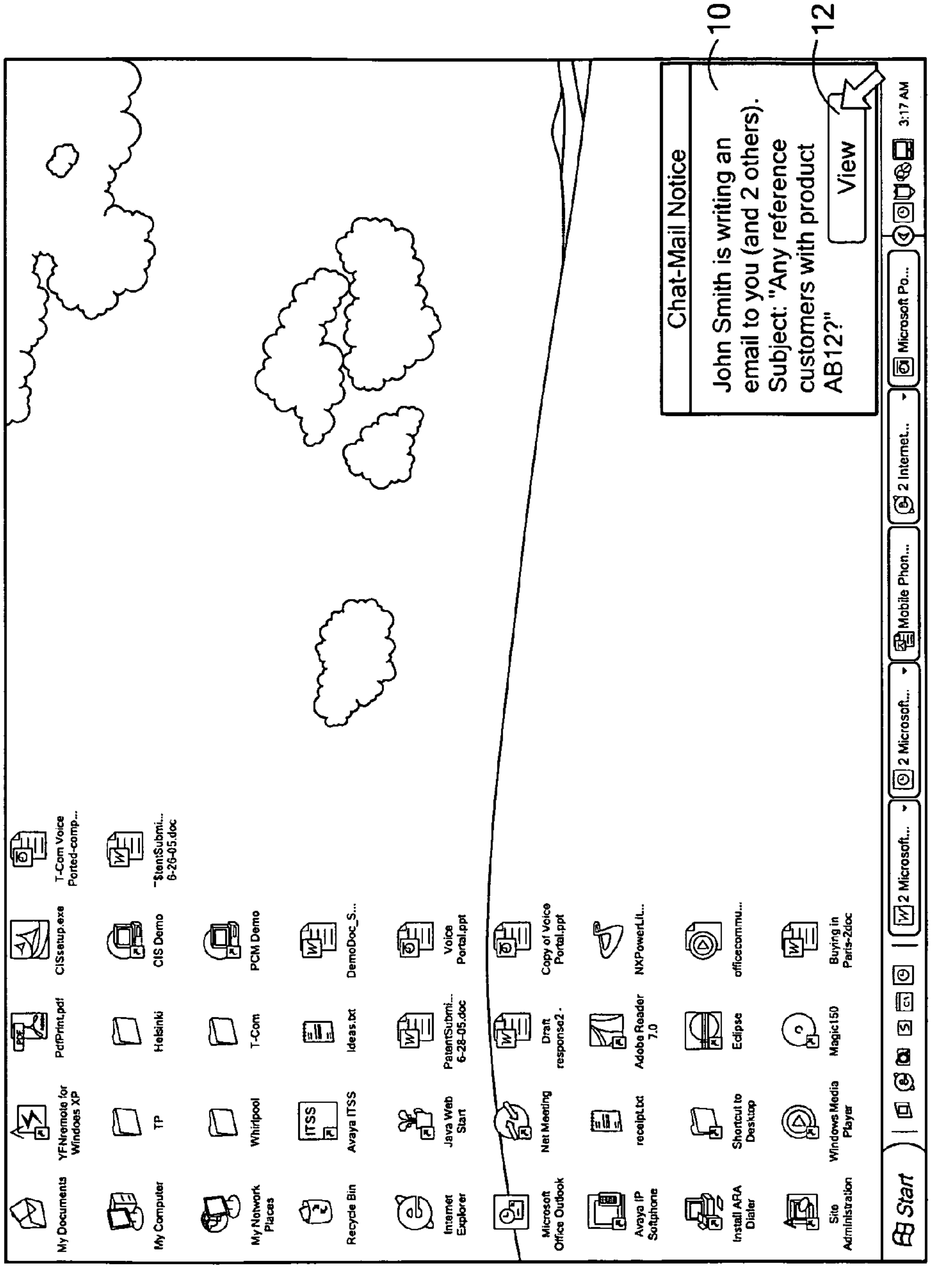
FIG. 1 depicts a screen shot wherein an intended Email recipient has received a notification that a person is addressing an Email to the intended recipient.

The presently disclosed method, software and apparatus for providing instant messaging functionality within an Email session leverages instant messaging functionality (plus additional features) to reduce the amount of Email traffic in a corporation, or between groups of people, while retaining all the benefits of Email as a state-less messaging solution if instant collaboration is not possible. The present method of providing Instant Messaging (IM) functionality within an Email session can also provide a more rapid response to questions typically sent by IM and/or Email without requiring extra effort on the part of the person asking the question. The present method of providing Instant Messaging (IM) functionality within an Email session also reduces the number of duplicate responses, or multiple partial-responses, to Email queries.

By way of the present method, software and apparatus providing instant messaging functionality within an Email session, intended Email recipients are notified that an Email is being written to them. The intended Email recipients are provided with the ability to view the content, and respond via IM chat while the Email is being constructed, as well as provided with the ability to remove (or request to remove) their name from the Email list.

Further, by way of the present method, software and apparatus providing instant messaging functionality within an Email session the ability to show the chat response from the recipient in-line with the text in the Email being built by the sender is provided. Also provided is the ability for the sender to keep or remove the chat response text in the Email, as well as the ability for the sender to edit the response text in the Email.

Further still, the intended recipient is given the option to call or otherwise contact the originator of the Email message via communication channels other than chat (phone call, propose conference call, etc.). The current status of an Email is shown in the recipient's mailbox. The current status can include a status of "response now being written by <name>", which will indicate that one or more of the other recipients of the Email is already working on a response. It is also possible for other recipients of the Email to view the current status/text of the response(s) that are being written.

By combining Email with IM, with the additional functions mentioned above, Email traffic is reduced in several ways. Anyone on the Email list and available and able to respond to a question in the Email can pre-empt the sending of the Email by responding in-line or by contacting the Email sender via another mechanism, such as a voice call, etc. An IM chat between the sender and the recipient can be edited/stored as part of the Email, making the question in the Email more complete or informative and reducing clarification Emails. Anyone on the Email list and unable to respond to a question can reduce Email traffic by requesting their removal from the Email's address list. A recipient that was not available while the original Email was written and sent can see if someone else is writing a response to the Email before they begin their own response. This person also has the ability to view the response as it is being written and add their comments to the response (or request their removal from the address list in the response).

The above functionality is accomplished in part by notifying people addressed in a "To" or "CC" address of an Email that an Email is currently being written to them. Intended Email recipients are invited to view the in-progress Email and to comment on the Email with the text in the Email by way of an IM chat session. Intended Email recipients are also able to send a file to include as an attachment to the Email.

Some of the functionality is provided by use of SIP (Session Initiation Protocol), an application-layer control protocol for Internet Telephony. SIP is typically used to establish sessions for features such as audio/videoconferencing, interactive gaming, and call forwarding to be deployed over IP networks. In addition to user authentication, redirect and registration services, SIP Server supports traditional telephony features such as personal mobility, time-of-day routing and call forwarding based on the geographical location of the person being called.

Figure 2:
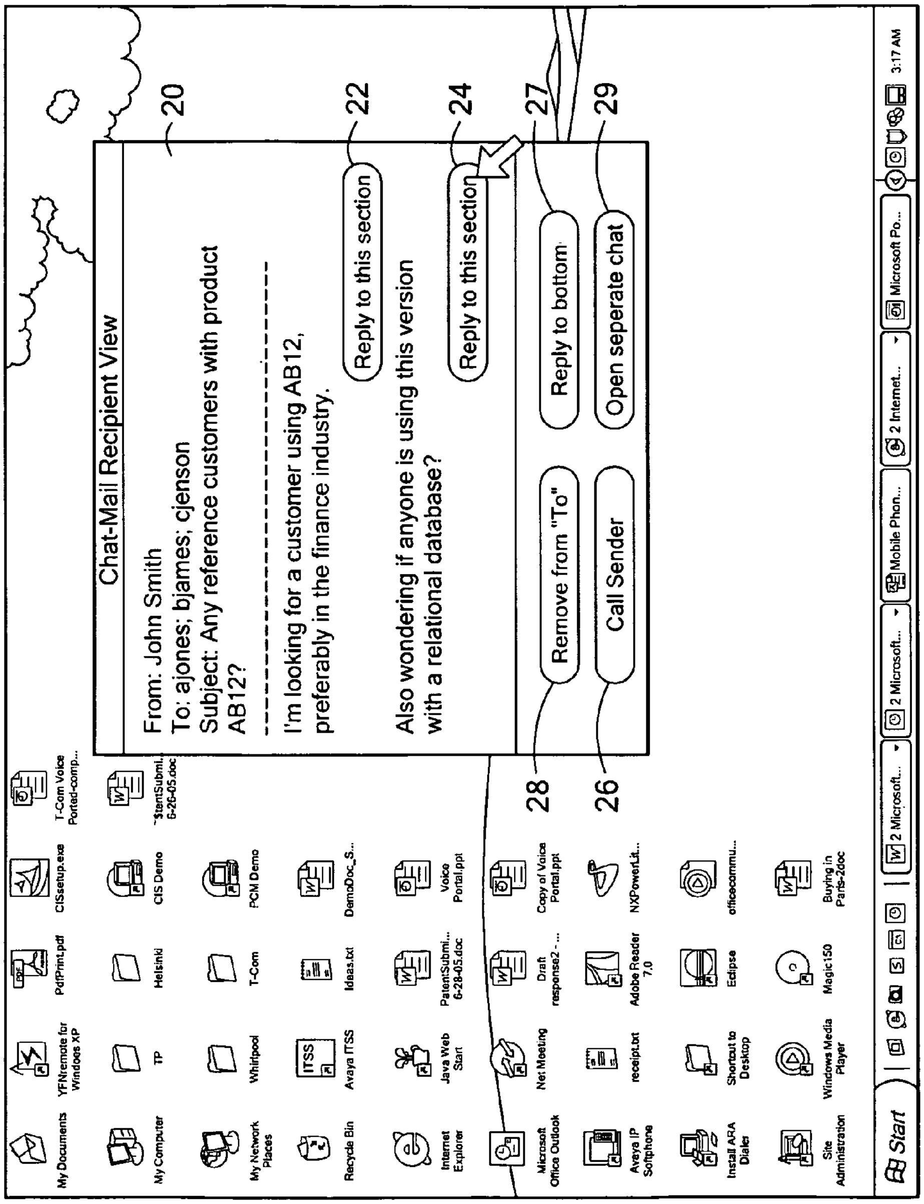
FIG. 2 depicts a screen shot wherein the intended recipient is viewing the Email addressed to the intended recipient.

Referring now to FIGS. 1-5, an example Chat-mail session is shown. In this example, an intended Email recipient receives a Chat-Mail notice 10 on their computer desktop when an Email is being composed by a third party that includes the intended recipient in the “To” or “CC” field of the Email message. The chat-mail notice here indicates that the intended recipient is an intended recipient of an Email from John Smith regarding a particular subject. The intended recipient is provided with the option of viewing the Email as it is being composed by clicking on the “View” button 12. When the user clicks on the View button 12, a chat-mail recipient view 20 is provided to the user, as shown in FIG. 2.

The chat-mail recipient view 20 on the users desktop includes the message being prepared by the originator as well as several buttons. One such button is the “Reply to this section” button 22. Should the user click on this button 22, a reply window would be provided allowing the intended Email recipient to reply to this section of the Email as the Email message is being composed. Button 24 allows the intended recipient to reply to a different section of the Email. Again, if this button 24 is selected a reply window would be provided allowing the intended recipient to enter a reply to this section of the Email. Also shown are they “Remove from To” button 26 which allows the intended recipient to request that the originator of the Email message remove the intended recipient from being sent a copy of the Email message being prepared. A “Reply to bottom” button 27 is supplied wherein the intended recipient can reply to a bottom of the body of the Email. Clicking on this button 27 results in a reply window being inserted into the bottom of the message. The intended recipient also has the option to select the “Call sender” button 28. Clicking on this button 28 allows the intended recipient to place a call to the Email originator to discuss the Email content in real time. Also available is the “Open separate chat” button 29. Activation of this button 29 results in a separate chat window being opened between the originator and the intended recipient.

Figure 3:
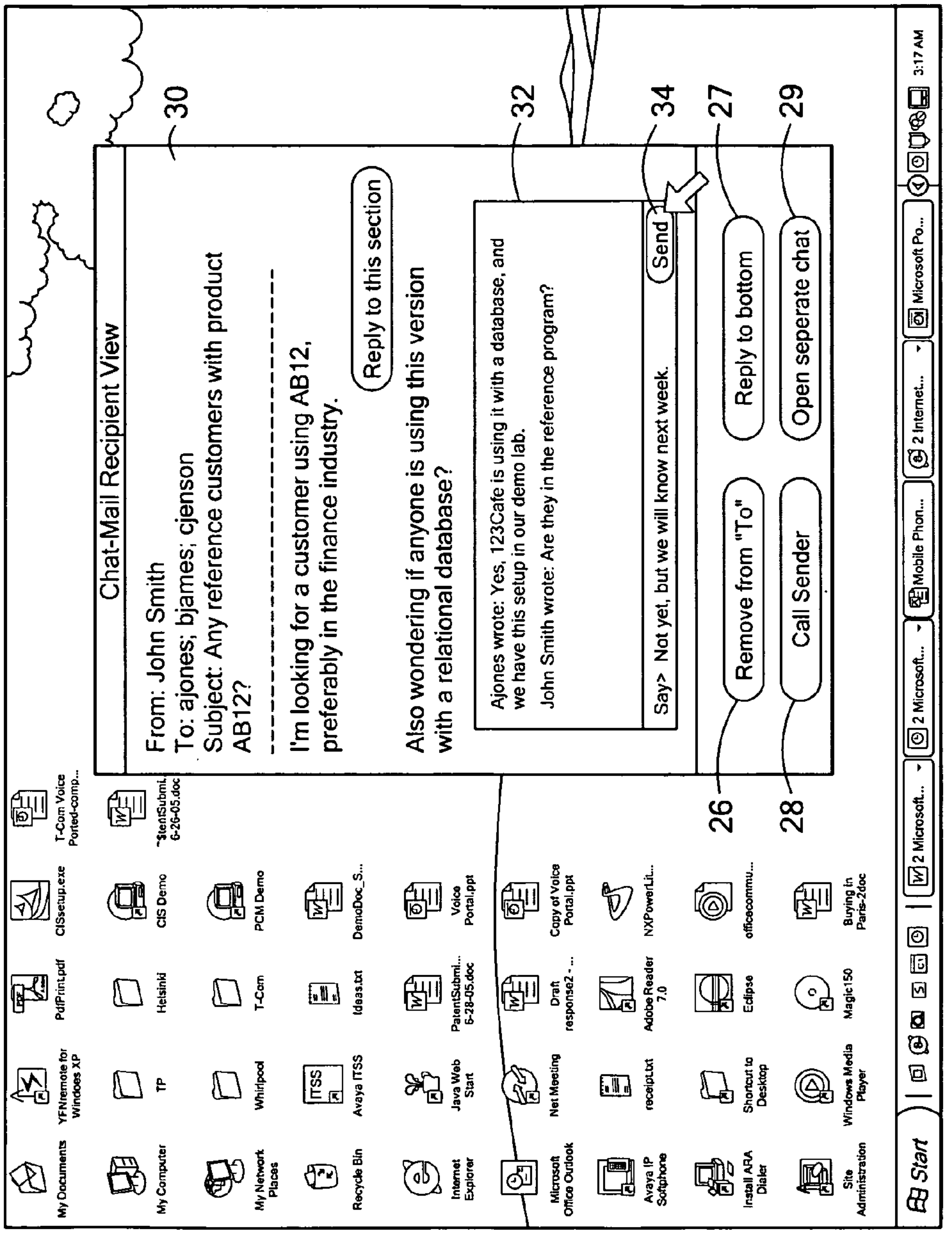
FIG. 3 depicts a screen shot wherein the intended recipient is responding to a section of the Email being addressed to the recipient.

Referring now to FIG. 3, the intended recipient has selected the “reply to this section button” 24 shown in FIG. 2, which results in a chat window 32 being provided on the screen. The chat window 32 comprises an instant messaging session wherein the intended recipient and the originator can chat. The chat message is entered into the chat window 32 when the intended recipient clicks the “Send” button 34. The entered text is then displayed in the messaging session.

Figure 4:
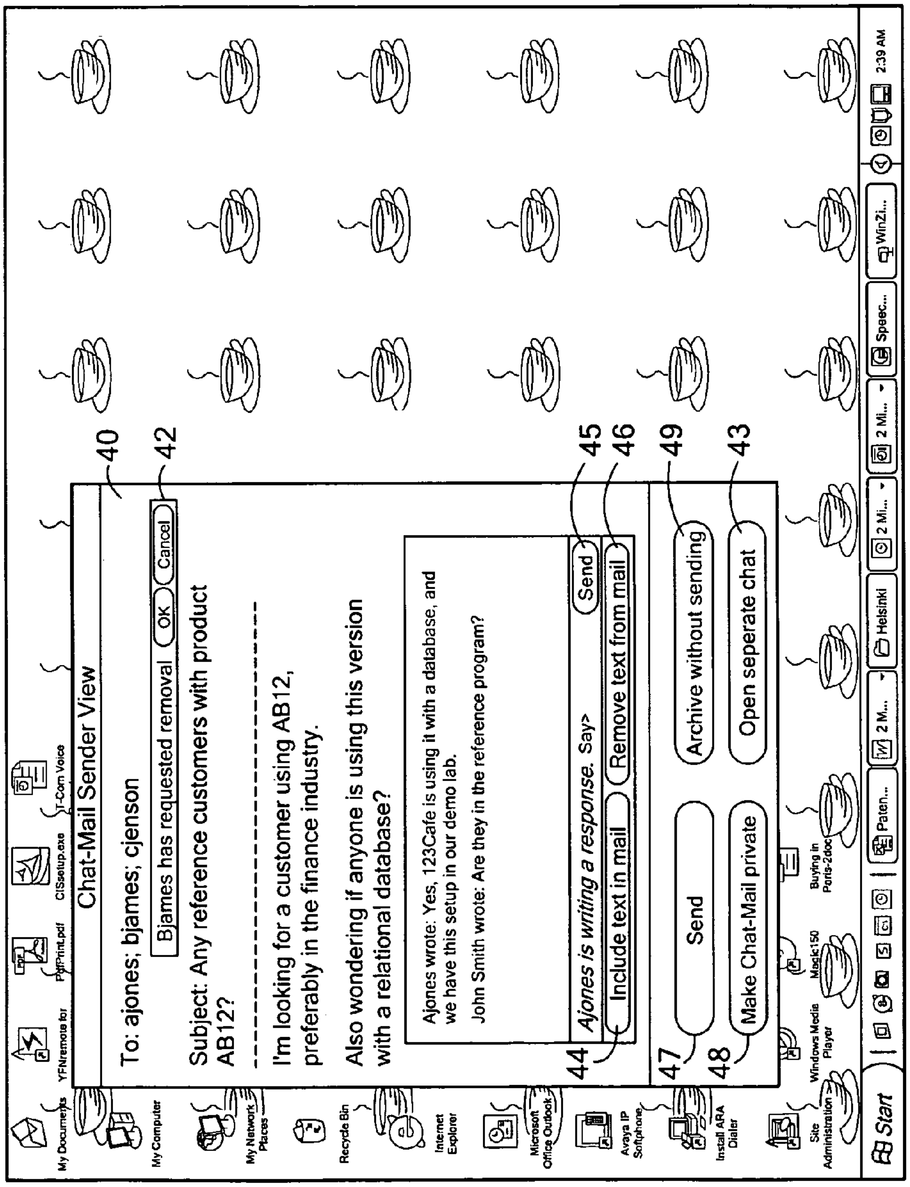
FIG. 4 depicts a screen shot wherein the Email originator has received a response to the Email being addressed to the intended recipient.

Referring now FIG. 4 a chat mail sender view 40 is shown. In this view, as can be seen in box 42 an intended recipient has requested removal from the Email message. The originator has the option of clicking “OK” to remove the requested party or can cancel the request to be moved. Also shown are an “include text in mail” button 44 which the originator can use to include the IM chat text in the body of the Email message being prepared. Alternately the originator can select the “Remove text from mail” button 46 for removing the same text from the Email message. A “Send” button 47 is provided which the originator clicks on to send the Email to the addressees. A “Make Chat Mail private” button 48 is also provided which allows the originator to initiate a private chat session with one of the intended recipients. An “Archive without sending” button 49 allows these originator to save the message without sending the message to the intended recipient(s). Also provided is the “Open Separate chat” button 43 that can be used to activate to stare separate instant messaging session with one of the intended recipient’s.

Figure 5:
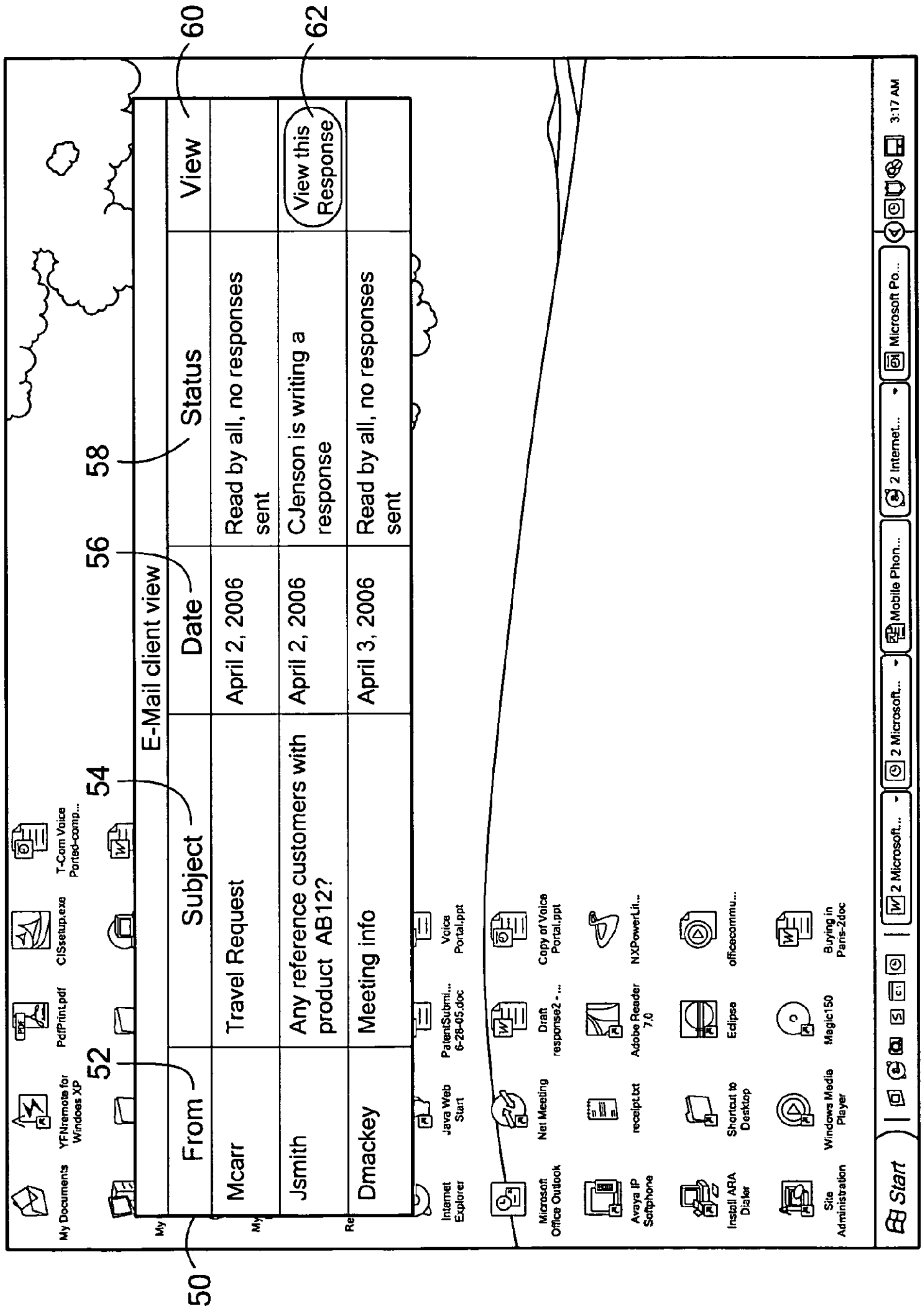
FIG. 5 depicts a screen shot of the recipient's in-box showing the status of various Emails.

Referring now to FIG. 5, the inbox for an Email session is shown. The Email client view 50 shows a “From” field 52 were the originator of Email messages are shown. A “Subject” field 54 shows the subject of the Email. Also listed is the date 56 which the Email was received. A status box 58 shows different statuses of the various Emails. For example, the first message has been read by all the recipients but no responses have been sent whereas for the second message a recipient is preparing a response and for the third message the message has been read by all and two responses have been sent. Also shown as a view field 60 wherein a response that is currently being written can be viewed by clicking on button 62.

Figure 6A:
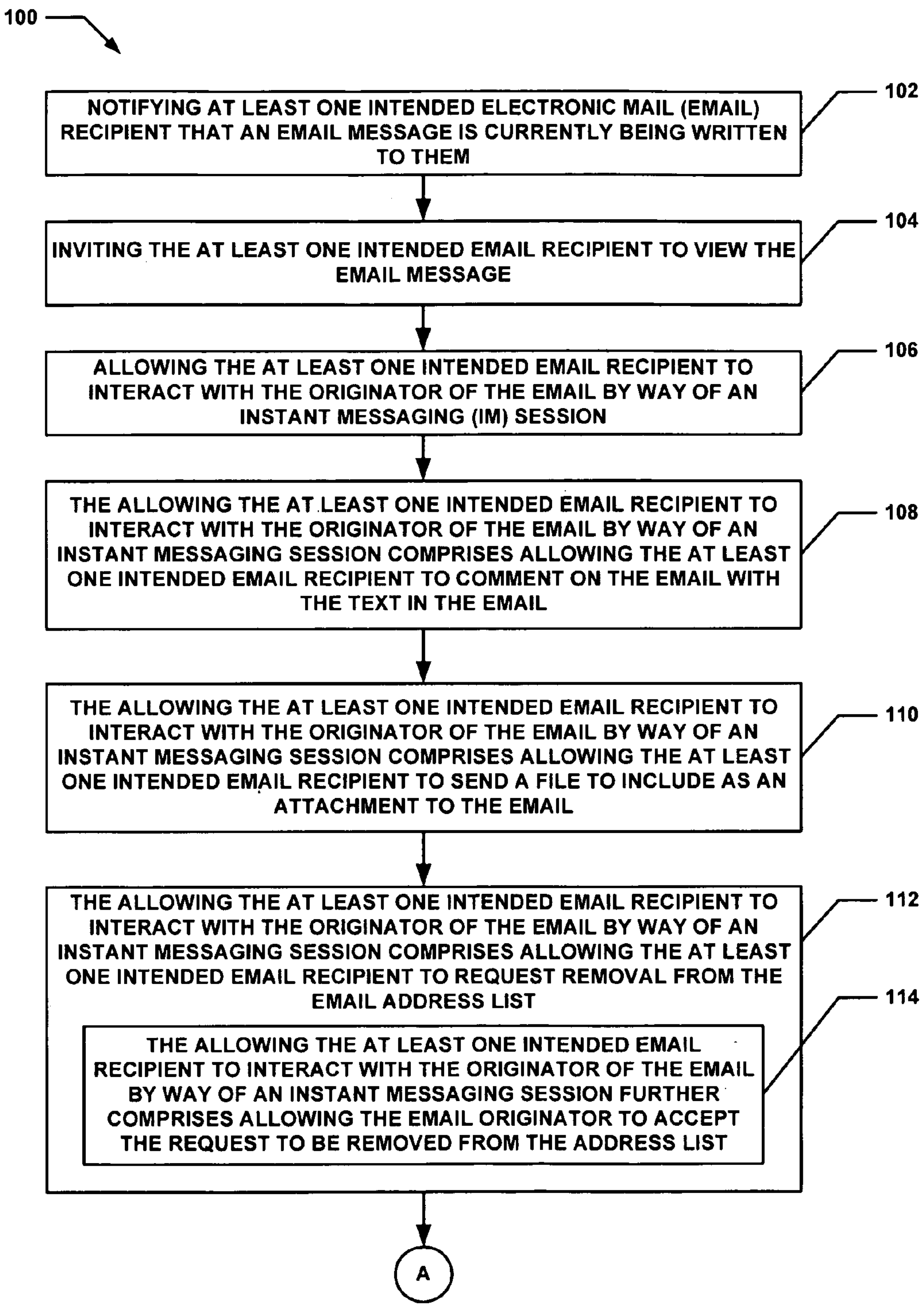
FIGS. 6A and 6B show a flow diagram of particular embodiment of a method of providing Instant Messaging (IM) functionality within an Email session in accordance with embodiments of the invention.
Figure 6B:
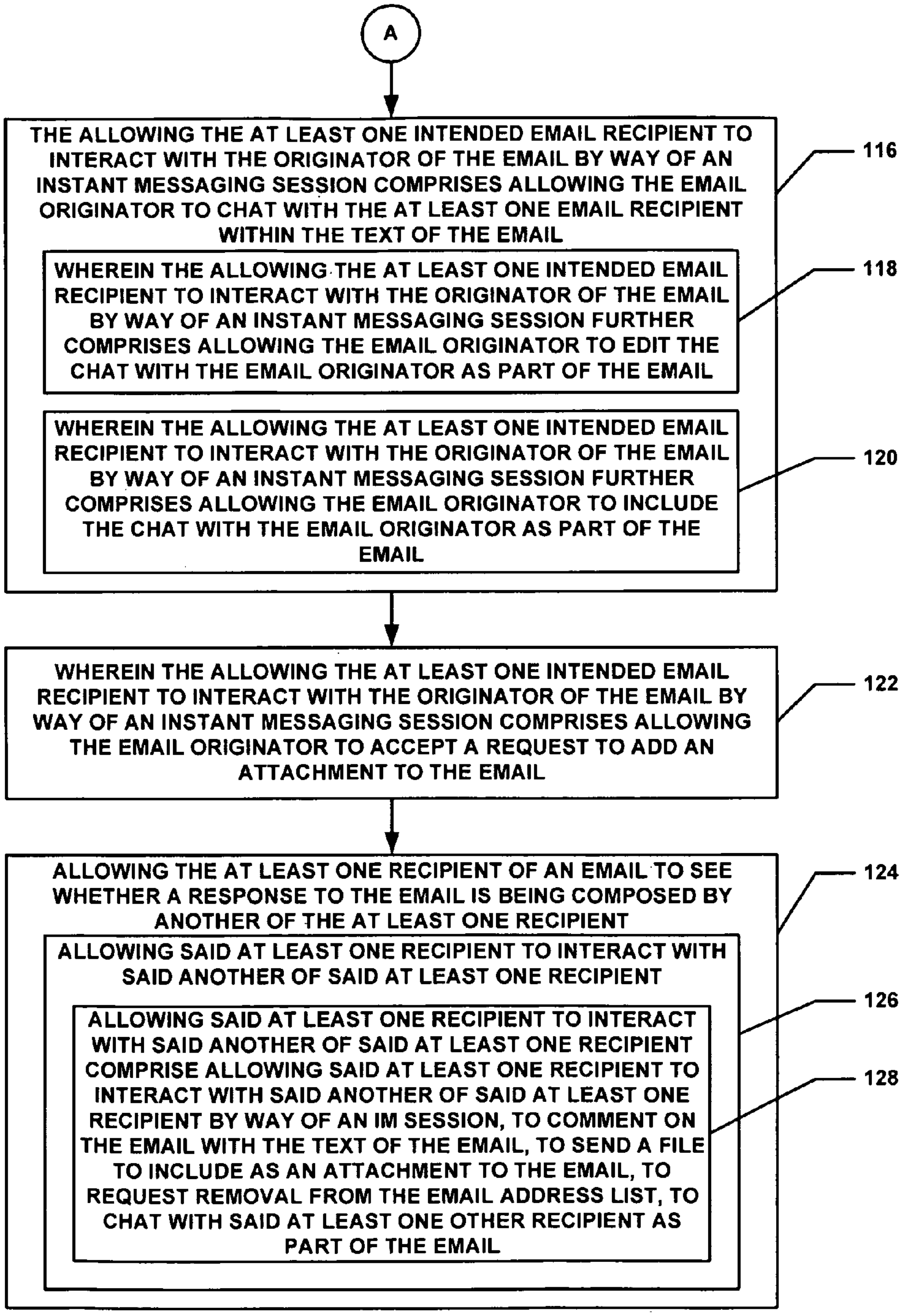

A flow chart of the presently disclosed method is depicted in FIGS. 6A and 6B. The rectangular elements are herein denoted “processing blocks” and represent computer software instructions or groups of instructions. The diamond shaped elements, are herein denoted “decision blocks,” represent computer software instructions, or groups of instructions which affect the execution of the computer software instructions represented by the processing blocks.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 6A and 6B, a method 100 of providing instant messaging functionality within an Email session is shown. The method begins with processing block 102, which discloses notifying at least one intended Electronic mail (Email) recipient that an Email message is currently being written to them. The intended recipients are typical listed in a “To:” field or a “CC” field of the Email message being sent.

Processing block 104 states inviting the at least one intended Email recipient to view the Email message. The intended recipients are notified that an Email is being generated which will be addressed to them and provides the intended recipient the opportunity to view the Email as it is being prepared.

Processing block 106 recites allowing the at least one intended Email recipient to interact with the originator of the Email by way of an instant messaging (IM) session. Processing block 108 discloses wherein the allowing the at least one intended Email recipient to interact with the originator of the Email by way of an instant messaging session comprises allowing the at least one intended Email recipient to comment on the Email with the text in the Email. Processing block 110 states wherein the allowing the at least one intended Email recipient to interact with the originator of the Email by way of an instant messaging session comprises allowing the at least one intended Email recipient to send a file to include as an attachment to the Email. Processing block 112 recites wherein the allowing the at least one intended Email recipient to interact with the originator of the Email by way of an instant messaging session comprises allowing the at least one intended Email recipient to request removal from the Email address list. Processing block 114 states wherein the allowing the at least one intended Email recipient to interact with the originator of the Email by way of an instant messaging session further comprises allowing the Email originator to accept the request to be removed from the address list.

Processing block 116 discloses wherein the allowing the at least one intended Email recipient to interact with the originator of the Email by way of an instant messaging session comprises allowing the Email originator to chat with the at least one Email recipient within the text of the Email. Processing block 118 states wherein the allowing the at least one intended Email recipient to interact with the originator of the Email by way of an instant messaging session further comprises allowing the Email originator to edit the chat with the Email originator as part of the Email. Processing block 120 recites wherein the allowing the at least one intended Email recipient to interact with the originator of the Email by way of an instant messaging session further comprises allowing the Email originator to include the chat with the Email originator as part of the Email. Processing block 122 discloses wherein the allowing the at least one intended Email recipient to interact with the originator of the Email by way of an instant messaging session comprises allowing the Email originator to accept a request to add an attachment to the Email.

Figure 7:
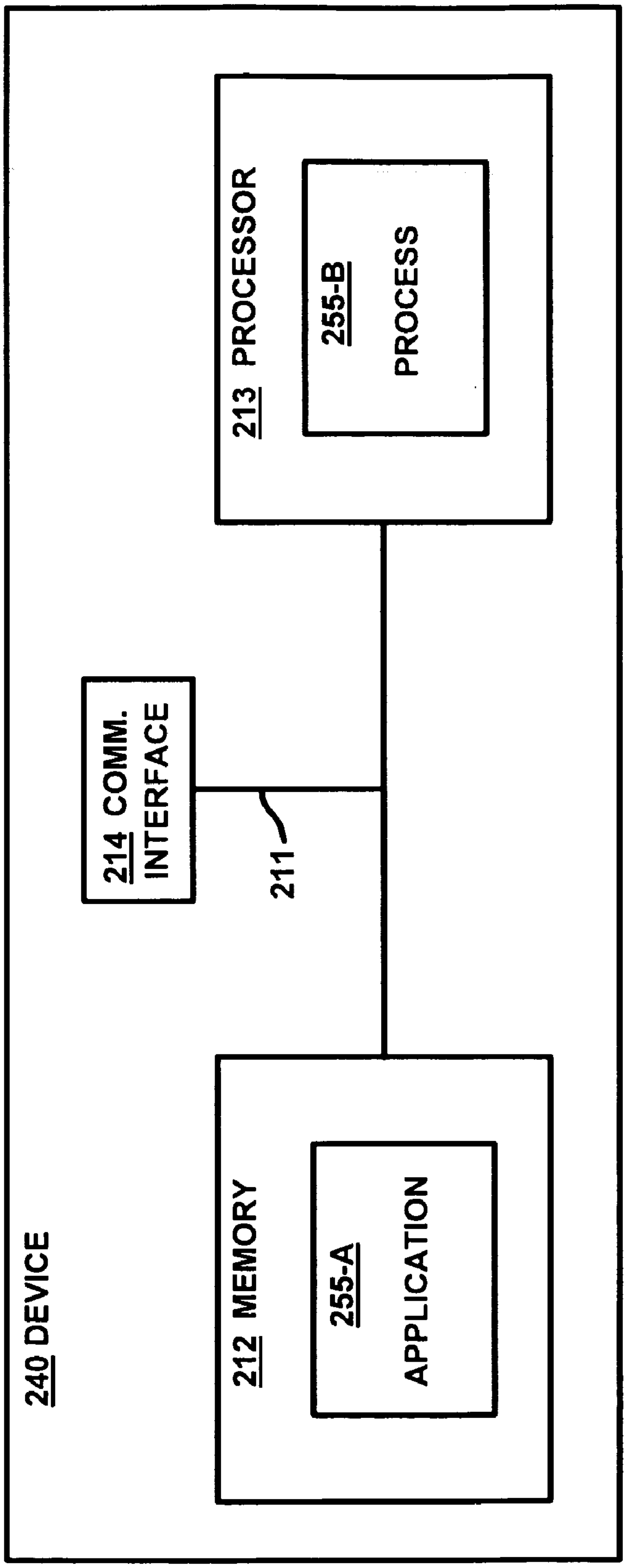
FIG. 7 illustrates an example computer system architecture for a computer system that provides Instant Messaging (IM) functionality within an Email session in accordance with embodiments of the invention.

Processing block 124 states comprising allowing the at least one recipient of an Email to see whether a response to the Email is being composed by another of the at least one recipient. Processing block 126 discloses allowing the at least one recipient to interact with the another of the at least one recipient. Processing block 128 states wherein the allowing the at least one recipient to interact with the another of the at least one recipient comprise allowing the at least one recipient to interact with the another of the at least one recipient by way of an IM session, to comment on the Email with the text of the Email, to send a file to include as an attachment to the Email, to request removal from the Email address list, and to chat with the at least one other recipient as part of the Email FIG. 7 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations providing instant messaging (IM) functionality within an electronic mail (Email) session, the method comprising:

notifying, by a computer system two or more intended Email recipients that an Email message is currently being written to them, the intended Email recipients being addressed in a “To” address field of the Email message;

inviting, by the computer system the two or more intended Email recipients to view the Email message that is currently being written;

displaying the Email message that is currently being written via a graphical user interface of a first recipient of the two or more intended Email recipients, the Email message being displayed with selectable buttons to initiate a chat session with an originator of the Email message;

in response to receiving input, via the graphical user interface of the first intended Email recipient, providing an IM session between the first Email recipient and the originator of the Email message;

receiving, via an IM interface of the first Email recipient comments that correspond to text in the Email message that is currently being written, the comments being received while the Email message is currently being written; and sending the Email message to at least one of the two or more intended Email recipients.

2. The method of claim 1 wherein receiving, via the IM interface of the at least one of the two or more intended Email recipients, comprises said at least one of the two or more intended Email recipients sending a file to include as an attachment to the Email message that is currently being written.

3. The method of claim 1 wherein receiving, via the IM interface of the at least one of the two or more intended Email recipients, comprises receiving, from said first Email recipient, a request to remove the first Email recipient from the Email address list.

4. The method of claim 1, further comprising:

receiving, via an IM interface of the Email originator, chat text entries to transmit to the at least one of the two or more intended Email recipients, the chat text entries being displayed within the text of the Email message currently being written; and receiving, via an IM interface of the Email originator, edits to the chat text entries to include as part of the Email message currently being written.

5. The method of claim 4, further comprising, in response to receiving input via the IM interface of the Email originator, including the chat text entries as part of the Email message currently being written.

6. The method of claim 1, further comprising receiving input, via the IM interface of the Email originator, that accepts a request to add an attachment to the Email message currently being written.

7. The method of claim 1 further comprising displaying to said at least one of the two or more intended Email recipients whether a response to the Email message, that is currently being written, is being composed by another of said at least one of the two or more intended Email recipients.

8. The method of claim 7 further comprising:

in response to receiving chat text entries, via the IM interface of the at least one of the two or more intended Email recipients, transmitting the chat text entries to the another of the at least one of the two or more intended Email recipients, to comment on the Email with the text of the Email, to send a file to include as an attachment to the Email, to request removal from the Email address list, and to chat with said at least one other recipient of the two or more intended Email recipients as part of the Email message that is currently being written.

9. The method of claim 1 wherein said notifying, said inviting and said interacting take place while said email is being currently written.

10. A non-transitory computer readable storage medium having computer readable code thereon providing instant messaging (IM) functionality within an electronic mail (Email) session, the medium including instructions in which a computer system performs operations comprising:

instructions for notifying two or more intended Email recipients that an Email message is currently being written to them, the intended Email recipients being addressed in a "To" address field of the Email message;

instructions for inviting the two or more intended Email recipients to view the Email message that is currently being written;

instructions for displaying the Email message that is currently being written via a graphical user interface of at least one of the intended Email recipients, the Email message being displayed with selectable buttons to initiate a chat session with an originator of the Email message;

instructions for providing an IM session between the at least one intended Email recipient and the originator of the Email message, in response to receiving input, via the graphical user interface of the at least one of the intended Email recipients;

receiving, via an IM interface of the at least one of the intended Email recipients, comments that correspond to text in the Email message that is currently being written, the comments being received while the Email message is currently being written; and instructions for sending the Email message to at least one of the intended Email recipients.

11. The non-transitory computer readable medium of claim 10 further comprising instructions for determining whether a response to the Email message, that is currently being written, is being composed by another of said at least one of the two or more intended Email recipients.

12. The non-transitory computer readable medium of claim 11 further comprising:

instructions for, in response to receiving chat text entries, via the IM interface of the at least one of the two or more intended Email recipients, transmitting the chat text entries to the another of the at least one of the two or more intended Email recipients, to comment on the Email with the text of the Email, to send a file to include as an attachment to the Email, to request removal from the Email address list, and to chat with said at least one other recipient of the two or more intended Email recipients as part of the Email message that is currently being written.

13. The non-transitory computer readable medium of claim 12, further comprising:

receiving, via an IM interface of the Email originator, chat text entries to transmit to the at least one of the two or more intended Email recipients, the chat text entries being displayed within the text of the Email message currently being written; and receiving, via an IM interface of the Email originator, edits to the chat text entries to include as part of the Email message currently being written.

14. The non-transitory computer readable medium of claim 13, further comprising instructions for including, in response to receiving input via the IM interface of the Email originator, the chat text entries as part of the Email message currently being written.

15. The non-transitory computer readable medium of claim 14 wherein said instructions for receiving, via the IM interface of the at least one of the two or more intended Email recipients, comprises instructions for receiving, from said at least one of the two or more intended Email recipients, a request to remove the at least one of the two or more intended Email recipients from the Email address list.

16. The non-transitory computer readable medium of claim 15 wherein said instructions for receiving, via the IM interface of the at least one of the two or more intended Email recipients, comprises instructions for said at least one of the two or more intended Email recipients to send a file to include as an attachment to the Email message that is currently being written.

17. The non-transitory computer readable medium of claim 16, further comprising instructions for receiving input, via the IM interface of the Email originator, that accepts a request to add an attachment to the Email message currently being written.

18. The non-transitory computer readable storage medium of claim 17, wherein said notifying, said inviting and said interacting take place while said email is being currently written.

19. A computer-implemented method in which a computer system performs operations providing instant messaging (IM) functionality within an electronic mail (Email) session, the method comprising:

notifying two or more intended Email recipients that an Email message is currently being written to the two or more intended Email recipients, the two or more Email recipients being addressed in a "To" address field of the Email message;

receiving, via a graphical user interface, a selection from a first Email recipient of the two or more intended Email recipients to view the Email message that is currently being written to the two or more intended Email recipients;

displaying to the first Email recipient the Email message, that is currently being written, including displaying selectable section reply buttons adjacent to respective sections of the Email message;

in response to receiving a selection from the first Email recipient of a given section reply button, displaying to the first Email recipient, within an Instant Messaging session interface, the Email message that is currently being written along with an Instant Message text entry communication field, such that the Instant Message text entry communication field is displayed adjacent to displayed text from a section of the Email message that corresponds to the selected section reply button;

receiving an Instant Message text entry from the first Email recipient, the text entry corresponding to the displayed text from the selected section of the Email message that is currently being written;

transmitting the Instant Message text entry to a sender of the Email message that is currently being written; and sending the Email message to at least one of the intended Email recipients.

20. The computer-implemented method of claim 19, further comprising:

receiving the Instant Message text entry at an Instant Messaging client of the sender of the Email message that is currently being written;

displaying the Instant Message text entry within an Instant Messaging session interface corresponding to the sender of the Email message that is currently being written along with the Email message that is currently being written; and in response to receiving input from the sender of the Email message that is currently being written, including the Instant Message text in the mail message that is currently being written at the specific portion of displayed text within the Email being currently written.

21. The computer-implemented method of claim 20, further comprising:

displaying, at an interface of the at least one of the two or more recipients of the Email message that is currently being written, that a response to the Email is being composed by another recipient of the two or more recipients of the Email message that is currently being written;

initiating a chat interface that connects the at least one recipient of the two or more recipients of the Email message with the another recipient of the two or more recipients of the Email message; and exchanging chat communications between the at least one recipient of the two or more recipients of the Email message with the another recipient of the two or more recipients of the Email message, including transmitting a file that is included as an attachment to the Email, and receiving a request to remove the at least one recipient of the two or more recipients of the Email as a recipient of the Email.

22. The computer-implemented method of claim 21, further comprising:

receiving edits to the Instant Message text entry within the Instant Messaging session interface corresponding to the sender of the Email message that is currently being written; and including the Instant Message text entry within the Email message that is currently being written as part of Email content.

* * * * *